United States Patent [19]

Westberg

[11] 4,094,181
[45] June 13, 1978

[54] METHOD IN DESTRUCTING CHILLS AND A DEVICE FOR CARRYING OUT THE METHOD

[76] Inventor: Torsten Boris Joel Westberg, Slojdgatan 4,, 811 00 Sandviken, Sweden

[21] Appl. No.: 617,838

[22] Filed: Sep. 29, 1975

[30] Foreign Application Priority Data

Oct. 9, 1974 Sweden .............................. 7412664

[51] Int. Cl.² ............................................ B21D 31/04
[52] U.S. Cl. .................................... 72/325; 225/103; 164/371; 249/61; 249/205; 299/22
[58] Field of Search ............................ 225/1, 93, 103; 164/371; 249/61, 187, 205; 299/20, 21, 22, 23; 125/23; 166/55, 55.2, 55.3; 72/325

[56] References Cited

U.S. PATENT DOCUMENTS

| 2,686,047 | 8/1954 | Duncan | 299/22 |
| 3,295,171 | 1/1967 | Strange et al. | 249/61 |
| 3,727,599 | 4/1973 | Sugiki et al. | 225/103 |
| 3,931,997 | 1/1976 | Enami | 125/23 R |

Primary Examiner—Lowell A. Larson
Attorney, Agent, or Firm—Zarley, McKee, Thomte, Voorhees & Sease

[57] ABSTRACT

This invention is related to an improved technique for destructing chills. A novel tool, preferably in the form of a piston cylinder mechanism is introduced into the cavity of the chill, said tool comprising at least two reciprocally movable parts which are set in motion relative to each other in the cavity so as to squeeze apart the walls of the chills or portions thereof.

8 Claims, 4 Drawing Figures

METHOD IN DESTRUCTING CHILLS AND A DEVICE FOR CARRYING OUT THE METHOD

Chills have to be discarded after a longer or shorter time of use. Since chills inherently contain substantial quantities of material which is useful for production of iron or steel, the chills are re-used by re-casting them as scrap. Due to the cavity in each chill, it is not, however, technically satisfactory to charge the chills directly into the furnace in question in the shape they normally have, because then the cavity or space of the chill, which is empty or possibly only partially filled with other scrap, would imply an incomplete, cost-increasing utilization of the capacity of the furnace. Therefore, it is necessary to destruct the chill and desintegrate it into smaller pieces which may fill the furnace more complete.

In the destruction of chills, one has hitherto proceeded in such a manner that a heavy body, e.g. a ball, is dropped from a considerable height onto the chill in order to smash or crush or at least deform it. This procedure has, however, proved to be unsatisfactory in several ways, especially in respect to the capacity of destruction. Thus, by this procedure merely about 2 to 3 chills per hour can be destructed with satisfactory results for the rest, what is extremely ineffective and costly for the whole re-use process.

The present invention aims at eliminating the above related inconveniences and providing for a rational and economical destruction of chills. To this end the invention relates to a method which is primarily characterized in that a tool comprising at least two reciprocally movable parts is introduced in the cavity of the chill, and that said parts are set in motion relative to each other substantially across the length of the chill, preferably by one part being pushed out from the other part so as to squeeze apart the walls of the chills or portions thereof.

Additionally, the invention also relates to a device for carrying out the method. The features of this device are defined in the accompanying claims.

With reference to the attached drawings, a closer description of an embodiment of the invention, referred to as an example, will follow hereinafter.

Figure 1:
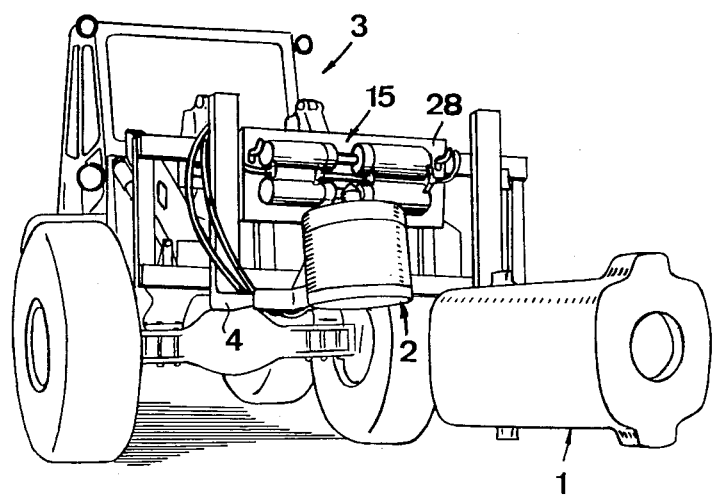
FIG. 1 is a perspective view illustrating the inventive device supported on a vehicle together with a chill to be destructed.

In the drawings, 1 designates a discarded chill which is to be destructed. 2 designates an inventive tool by means of which the destruction is to be performed. As shown in FIG. 1, the tool 2 is supported on a vehicle, generally designated 3, which in this case consists of a fork vehicle or fork-lift truck, one fork 4 of the vehicle being utilized for supporting the tool. The other fork (not visible) can, as illustrated, advantageously be utilized for conveying and handling the chill 1.

Figure 3:
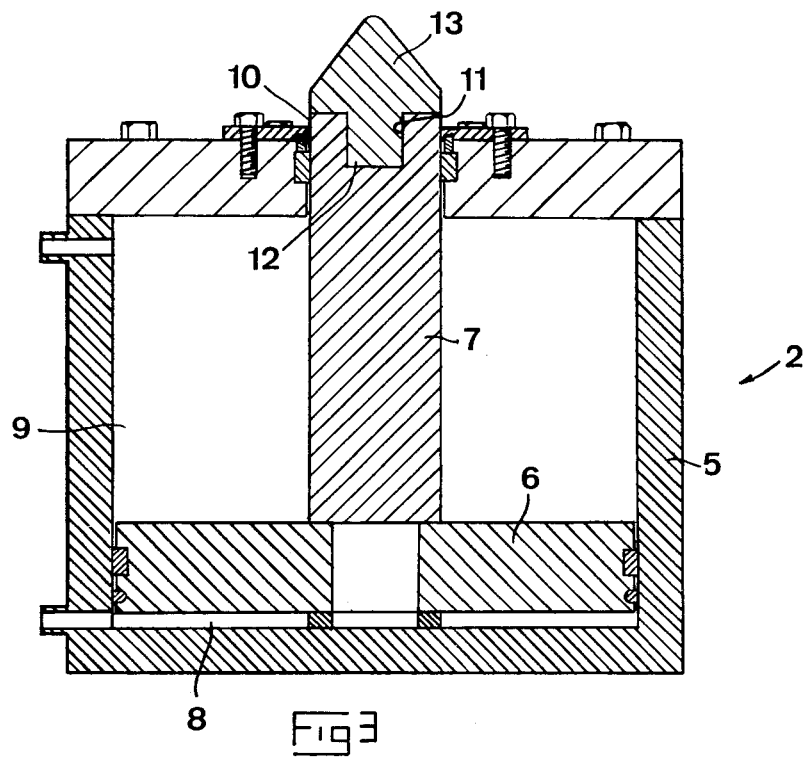
FIG. 3 is a section through the tool of FIG. 2.

Reference is now made to FIG. 3 which illustrates the tool 2 in detail. In accordance with the preferred embodiment of the invention, the tool consists of a piston cylinder mechanism comprising a relatively short and thick cylinder 5, a piston 6 and a piston rod 7 which projects through an aperture in an end fitting of the cylinder. The piston 6 divides the interior of the cylinder in two chambers, viz. a charging or pressure chamber 8 and a return chamber 9.

The piston rod 7 presents at its external end 10 directed away from the piston 6 a recess 11 which receives a dowel-shaped projection 12 of an extension member, generally designated 13. This extension member 13 is included in quite a series of analogous members which, however, have different lengths in order to make an exchange of members possible so that the piston rod can be given a varying effective length. Each of such extension members advantageously presents a tapered or conical end as illustrated in FIG. 3, whereby the end, in being pushed out of the cylinder, achieves an extremely good hold in the chill wall to which it is applied. Preferably the recess 11 is cylindric, and at the same time the projection 12 is in the form of a cylindric dowel having substantially the same dimensions as the recess, whereby a rapid exchange of the extension member is allowed.

Figure 4:
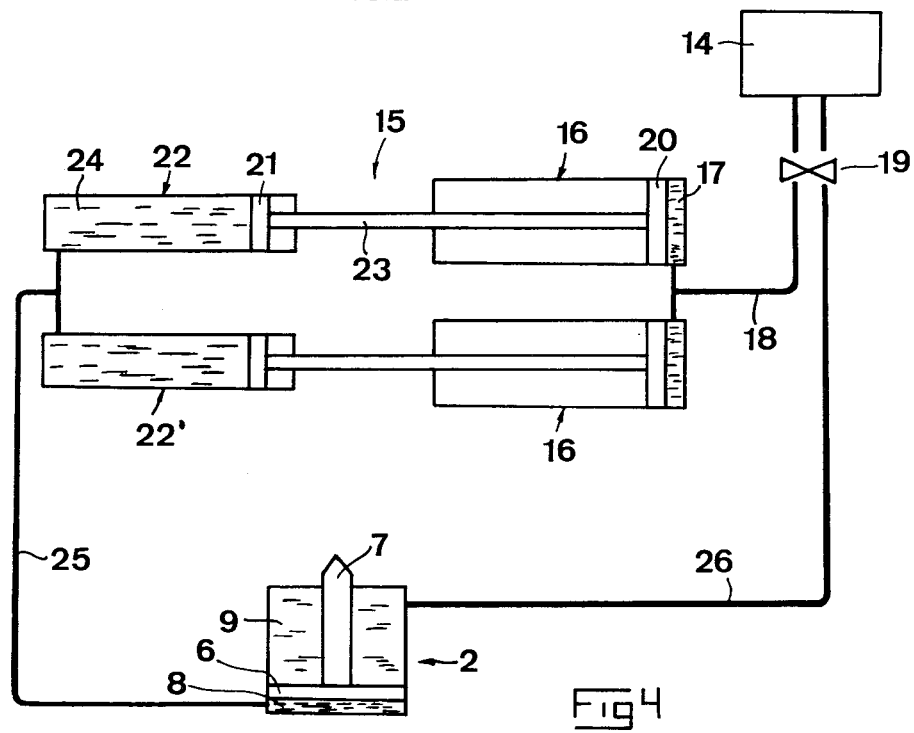
FIG. 4 is a schematic representation of different components included in the device.

A favourable operation of the tool 2 is shown schematically in FIG. 4. Here 14 designates a pressure fluid source which, in the example given, suitably consists of the proper pressure fluid source of the vehicle. Per se, it is conceivable to connect this pressure fluid source 14 directly to the charging chamber 8 of the tool 2. However, in accordance with a preferred embodiment of the invention, the source 14 is connected to the tool via a pressure intensifier, generally designated 15, which suitably at least doubles the pressure emanating from the source. In this case the pressure intensifier 15 comprises two primary piston cylinder mechanisms 16, 16', the pressure chambers 17 of which jointly communicate with the source 14 via a conduit 18 which leads to the source over a control mechanism 19. The pistons of the primary piston cylinder mechanisms are mechanically coupled to the pistons 21 of two secondary piston cylinder mechanisms 22, 22', in this case by means of common piston rods 23, to the opposed ends of which the pistons 20, 21 in question are fitted. The sectional area of the piston and the cylinder casing in each of the primary piston cylinder mechanisms is, in accordance with the inventive idea, at least twice as large as the sectional area of the piston and the cylinder casing respectively of the analogous secondary piston cylinder mechanism. The operation chambers 24 of the two secondary piston cylinder mechanisms communicate with the charging chamber 8 of the tool 2 via a feed conduit 25. From the return chamber 9 of the tool 2 a return conduit 26 leads to the source 14 over the control mechanism 19.

The pressure source and all piston cylinder mechanisms preferably operate by means of a hydraulic fluid.

The device illustrated in FIG. 4 operates in the following manner. From the pressure source hydraulic fluid is fed having a pressure which theoretically would give a certain nominal total force of for instance 240 tons to the piston rod 7 of the tool 2 if it were not so that the pressure intensifier 15 were disposed between the pressure source and the tool. Now, however, the hydraulic fluid from the pressure source is fed into the primary piston cylinders 16, 16', the pistons of which are set in motion with a certain force determined by the initial pressure. This pressure force is transmitted via the piston rods 23 to the secondary piston cylinder mechanisms 22, 22', in the operation chambers of which, thanks to the given ratio between the sectional areas of the primary and secondary mechanisms, respectively, a specific pressure is acheived, which, if said ratio between the sectional areas is 2:1, becomes twice as high as the specific pressure in the chambers 17. From this it follows that the total compressive force of the tool 2 is doubled from the rate of 240 tons mentioned as an example to 480 tons, if the friction losses occuring are neglected. When the piston 6 of the tool 2 moves in such a direction that the piston rod is pushed out of the cylinder, hydraulic fluid is fed out from the return chamber 9 into the source 14 via the conduit 26. When the piston rod is to be brought back after a terminated operation stroke, the control mechanism 19 is adjusted so that hydraulic fluid is again pumped into the return chamber and at the same time the hydraulic fluid occuring in the chamber 8 of the tool is pushed back to the secondary piston cylinder mechanisms, which in turn means that the piston rod assemblies are brought back to their original positions shown in FIG. 4.

Because the pressure intensifier 15 comprises two or more pairs of piston cylinder mechanisms of the type shown, the different cylinders included in the device can be made small, thus achieving a compact device.

Figure 2:
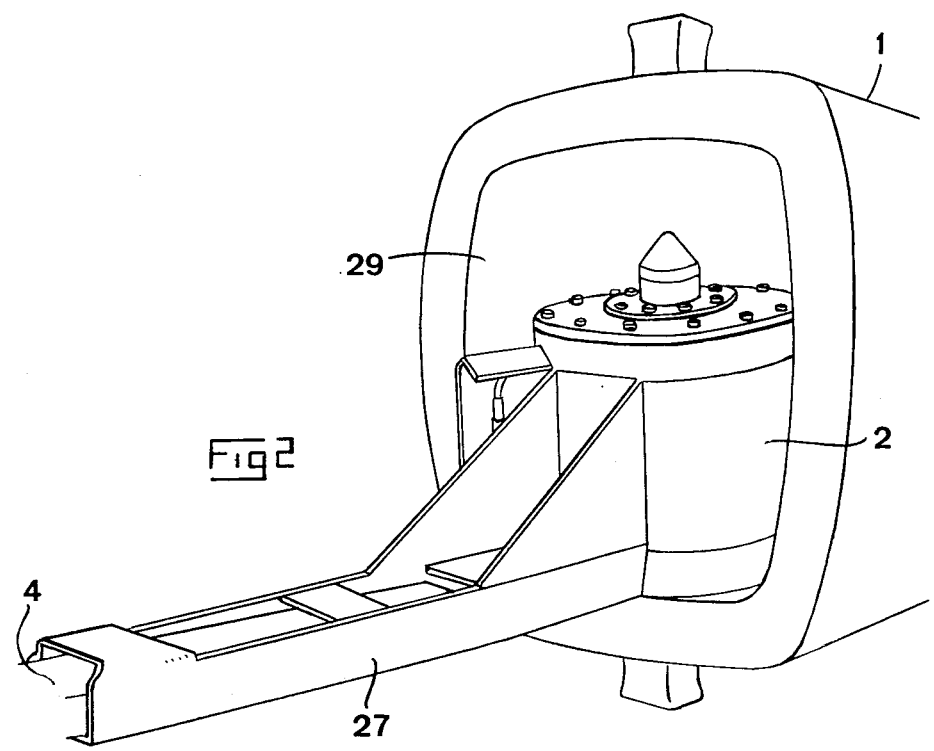
FIG. 2 is a perspective detail view showing in an enlarged condition, a tool of the device introduced into the cavity of the chill.

FIG. 2 shows how the tool 2 is provided with attachment means 27 for attaching the tool to the vehicle in question. In this case the attachment means 27 consists of a socket mainly made from a U-beam in which a fork 4 of the vehicle can be introduced. Of course, it is possible to design the attachment means in other ways.

FIG. 1 illustrates how the previously described pressure intensifier 15 is fixed to a frame in the form of a plate 28, which in an arbitrary manner can be hanged on or otherwise applied to the fork assembly of the vehicle, suitably on or between the two vertical portions of the forks proper.

When destructing chills by means of the device according to the invention, one proceeds in the following manner. With the tool 2 supported on the fork 4 the vehicle 3 can fetch a chill 1 from the stock place in question and convey the chill to a suitable scrapping place. The chill 1 is put down on a suitable base whereupon the tool 2 is introduced in the cavity 29 of the chill as illustrated in FIG. 2. Then the tool is started by feeding the pressure fluid required from the pressure source 14 of the vehicle, the piston rod 7 together with an extension member 13 adapted to the size of chill in question being set in motion relative to the cylinder or cylinder casing. The piston rod or more particularly the extension chamber 13 thereof is abutted against the inside of one of the chill walls and in reaching the pressure force required it will squeeze out the chill wall in question from the rest of the chill. Does it concern a chill of relatively brittle material, substantially the whole wall can be squeezed out in one portion, while by chills of more tenacious material it will be the question of squeezing out and apart pieces or portions only from the wall in question. The squeezing apart a first wall from the rest of the chill constitutes a first operation of the procedure.

In a second operation step either the chill or the tool is turned 90° relative to the tool or the chill respectively in order to make it possible to squeeze apart a second wall being perpendicular to the first removed chill wall. In squeezing apart the second wall the tool 2 operates in the same manner as described above. After two chill walls, perpendicular to each other, having been removed from the rest of the chill, the chill has become satisfactory destructed inasmuch as the cavity is now removed and the remaining portions can be charged without causing any appreciable voids in the furnace.

When squeezing apart pieces or portions from chill walls of tenacious material, it is necessary to apply the tool in each individual operation step at two or more locations spaced apart along the length of the chill, hereby removing the pieces one by one from the wall in question.

The advantages of the invention are evident in that the inventive method allows a considerably faster destruction than what has been achievable hitherto. Thus 10 to 15 chills per hour can be destructed by means of the inventive method. In addition, the inventive method provides an appreciably more convenient and less dangerous work than the previously practiced procedure of smashing the chills by dropping heavy bodies thereon.

Naturally, the invention is not limited merely to the embodiment described and illustrated in the drawings. Thus, it is for instance conceivable to use, instead of a simple piston cylinder mechanism as a working tool, other tools which can be introduced in the chill and, by the reciprocal motion of at least two parts of the tool, perform a separation of the chill walls. Further it is conceivable to let the tool be supported on other vehicles than just a fork vehicle, though this type of vehicle has proved to be advantageous. In addition, it is possible to combine two or more individual tools with each other, it being conceivable to have the tools operating in mutually different directions. Also other modifications of the invention are conceivable within the scope of the acompanying claims.

I claim:

1. A method for destructing chills, characterized in that a tool comprising at least two reciprocally movable parts is introduced into the cavity of the chill, and that said parts are set in motion relative to each other substantially across the length of the chill, preferably by one part being pushed out from the other part so as to squeeze apart the walls of the chills or portions thereof, said tool, during operation, being supported on a vehicle.

2. A method according to claim 1, characterized in that the vehicle is a forked vehicle having a pair of forks, and further that the tool is supported on one fork of the forked vehicle, the other fork of which may be used for conveying the chill.

3. A method according to claim 1, characterized in that pressure fluid for the tool is fed from a pressure source of the vehicle.

4. A device for destructing chills, characterized by a tool capable of being introduced into a chill and comprising at least two parts which are movable relative to each other, preferably by pushing out one part from the other with such a force that the walls of the chill or portions thereof are squeezed apart.

and further characterized in that the tool is a piston cylinder mechanism, the piston rod of which forms or is included in said first tool part, and the cylinder of which forms or is included in said second tool part, the mechanism being operational by means of a pressure fluid, suitably a liquid, from a pressure fluid source, and further characterized in that the charging or pressure chamber of the piston cylinder mechanism is connected to the pressure fluid source via a pressure intensifier which suitably at least doubles the pressure emanating from the source, and further characterized in that the pressure intensifier comprises at least two primary piston cylinder mechanisms jointly communicating with the pressure source, the pistons of said mechanisms being mechanically coupled to the pistons of two secondary piston cylinder mechanisms corresponding to said primary mechanisms, and the pressure chambers of which jointly communicate with the charging or pressure chamber of the tool, the sectional area of the piston and the cylinder of the primary mechanisms being larger, preferably at least twice as large as the sectional area of the piston and the cylinder of the corresponding secondary mechanisms.

5. A device according to claim 4, characterized in that the two pistons in each particular pair of primary and secondary mechanisms are fitted to the opposite ends of a common piston rod.

6. A device for destructing chills, characterized by a tool capable of being introduced into a chill and comprising at least two parts which are movable relative to each other, preferably by pushing out one part from the other with such a force that the walls of the chill or portions thereof are squeezed apart, said tool including means for attaching the tool to a vehicle.

7. A device according to claim 6, characterized in that the vehicle is a fork vehicle and that said attachment means consists of a socket in which a fork can be introduced.

8. A device according to claim 6, characterized in that the pressure fluid source for the tool consists of a pressure fluid source existing on the vehicle.

* * * * *